July 10, 1956     T. A. PIETRASZEK ET AL     2,753,599
METHOD OF MAKING A PRACTICE BALL
Filed Oct. 23, 1953

OUTER NYLON LAYER 8
INNER VINYL LAYER 7

INVENTORS
T. A. PIETRASZEK
F. S. MARTIN
BY Robert J. Patterson
ATTORNEY

United States Patent Office 2,753,599
Patented July 10, 1956

2,753,599

METHOD OF MAKING A PRACTICE BALL

Thaddeus A. Pietraszek, Fall River, Mass., and Frank S. Martin, Cranston, R. I., assignors to United States Rubber Company, New York, N. Y., a corporation of New Jersey Application October 23, 1953, Serial No. 387,951

4 Claims. (Cl. 18—47.5)

This invention relates to a method of making a practice or play ball. More particularly it relates to a method which represents improvements over the method described in the co-pending application of Robert W. Pooley et al., Serial No. 339,072, filed February 26, 1953, the disclosure of which is incorporated herein by reference.

The said application of Pooley et al. discloses a practice or play ball comprising a flexible compressible resilient closed-cell expanded core characterized by its great deadness and absence of rebound, and a thin continuous unexpanded shell surrounding the core, the shell being capable of taking and maintaining sharp surface definition over a long period of time, being highly wear-resistant, protecting the core against failure in service, being flexible and tenaciously adherent to the core, and permitting deformation of the core without separation or cracking of the shell.

More specifically, the said application of Pooley et al. discloses a practice or play ball having an inner core of closed-cell expanded polyvinyl chloride or like thermoplastic vinyl resin plasticized with both a high-boiling organic liquid plasticizer and a vulcanizable rubbery copolymer of an aliphatic conjugated diolefin hydrocarbon and another copolymerizable monomer, preferably a butadiene-acrylonitrile rubbery copolymer, which is compatible with vinyl resin and vulcanized during manufacture of the ball to lock the expanded structure against dimensional change, and a thin continuous surrounding outer shell of unexpanded plastic, typically composed of polyvinyl chloride or like vinyl resin plasticized with a high-boiling organic liquid plasticizer. This shell is flexible so as to not substantially change the playing behavior of the core, is tough, is capable of receiving and retaining with sharp definition any outer pattern, such as dimples, simulated seams and stitching, etc. imparted thereto in a final molding operation, is tenaciously adhered to the core by integral bonding during manufacture and permits deformation of the core, during play, without separation or cracking of the shell. The shell also is almost invariably pigmented and completely covers the core so that the ball has a highly attractive appearance.

The core of the ball described in the Pooley et al. application is preferably formed from a mixture of the vinyl resin, rubbery material and liquid plasticizer in relative proportions of from 30 to 125 parts of the rubbery material and from 60 to 80 parts of the liquid plasticizer per 100 parts of vinyl resin. The sum of the rubbery and the organic liquid plasticizers will usually equal from 100 to 175 parts per 100 parts of vinyl resin.

The ball of the Pooley et al. application is described as being made in the following manner. A miniature spherical mold having a volume much less than that of the core of the final ball is nearly but not completely filled with a mixture of the vinyl resin, rubbery plasticizer, liquid plasticizer, chemical blowing agent, and vulcanizing and other compounding ingredients for the rubbery material. The miniature mold is heated, while held closed under pressure, to a temperature sufficient to fuse the resin, rubber and plasticizer into a single phase, decompose the blowing agent and partially vulcanize the rubber sufficiently to retain the gas in the form of closed cells during the subsequent expansion. The miniature mold is then cooled, and the miniature core is removed and heated while unconfined, typically to 365° F., to complete vulcanization of the rubber and expand to maximum size which is considerably greater than that of the core in the finished ball. The expanded core is then cooled to approximately room temperature, causing shrinkage to about the size of the core of the finished ball and causing the surface to assume a wrinkled and shrunken appearance. The outer shell is then applied to the core, typically by dipping several times, with intermediate drying to remove solvent, in a pigmented organic solvent solution of vinyl resin and liquid plasticizer therefor, to build up a shell of a thickness of from 0.5 to 4 mils. The dried "painted" core is then dusted with a mold parting agent (to prevent sticking during subsequent processing) and refrigerated to low temperature, typically below 40° F., to shrink it to a size substantially less than that of the finished ball, in preparation for the final molding to impress a desired surface pattern. This shrinkage step is so performed as to reduce the diameter of the ball to such an extent that it will not extend over the lands of the final shaping mold. The shrunken ball is then subjected to final molding under heat and pressure in a spherical mold having its inner surface engraved with the desired surface pattern such as dimpling or simulated seams and stitching and having the desired final diameter. After cooling under pressure, the finished ball is removed. In the finished ball the shell typically makes up from about 20 to about 40% by weight and from about 0.5 to about 4.0% by volume, the core correspondingly making up from about 80 to about 60% by weight and from about 99.5 to about 96.0% by volume. A practice golf ball usually is approximately 1.68" in diameter and a practice baseball approximately 2.9". The core of the ball generally has a density not exceeding 8 lbs. per cubic foot and more commonly not exceeding 5 lbs. per cubic foot. A practice golf ball will usually weigh from 60 to 100 grains and a practice baseball from 300 to 350 grains.

The Pooley et al. application discloses that it is preferable to form the shell from a pigmented solution of the vinyl resin and a liquid plasticizer therefor in a volatile organic solvent. The proportions typically range from 30 to 80 parts of plasticizer and from 10 to 25 parts of pigment per 100 parts of vinyl resin.

In the accompanying drawings:

Fig. 1 portrays the beginning of the miniature molding operation;

Figure 1:
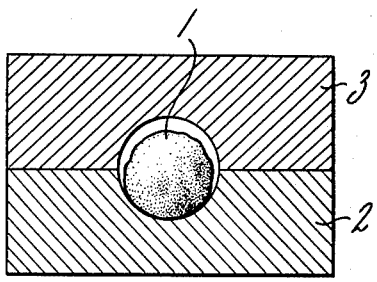

Our invention is based on the discovery that by forming the shell of an inner layer of plasticized vinyl resin and an outer layer of nylon (which may or may not be plasticized, e. g., with glycerin) many advantages are achieved as compared to a shell made entirely of plasticized vinyl resin. Among these advantages the following may be mentioned. A very much improved appearance results; a more sharply defined dimple or other pattern applied in the final molding is obtained; the surface is more uniform and smoother. Application of the nylon coating over the vinyl resin layer obviates the necessity of dusting and refrigerating the painted cores preparatory to the final surface molding operation; the nylon film laid down upon volatilization of the solvent used to dissolve the nylon to form the coating solution is very strong and possesses the property of shrinking and contracting the vinyl resin-coated core sufficiently to enable it to be inserted in the final forming mold without extending over the lands thereof which would cause cutting of the ball as the mold closed; by making it unnecessary to dust and to refrigerate to shrink the ball, marked economies result. The nylon forms an excellent outer film on the ball and this film has sufficient stretch so that it does not break when the ball is deformed during hitting. The nylon film has excellent adhesion to the underlying vinyl layer so that it is not loosened during hitting. In addition a thinner shell can be used than would be the case if the shell were formed entirely of the vinyl resin composition. A thinner shell is advantageous because it makes possible less overall weight which is desirable as a means of reducing the flight of the practice ball.

In making a practice or play ball according to our invention, we proceed in exactly the same manner as described above down to the point where the expanded core at approximately room temperature is obtained. At this stage the core has a wrinkled shriveled surface and approximately spherical shape, and a diameter approximating the diameter of the core in the final form.

To this core we apply our composite shell composed of an inner vinyl resin layer and an outer layer of nylon in the form of a soluble synthetic linear condensation polyamide. We do this by applying one or more coats of a solution of a vinyl resin and a plasticizer therefor in a volatile organic solvent, with drying after each application to remove solvent, to build up a layer of suitable thickness after which we apply one or more coats of a solution of nylon, with or without a plasticizer therefor, in a volatile solvent, with drying after each coat, to build up an outer layer of nylon of suitable thickness. Almost invariably the vinyl resin solution is pigmented in order that the vinyl resin layer may completely hide the core. Usually a single application of the nylon solution will suffice to give a nylon jacket of the right thickness.

Each of the coats used to build up the shell should be allowed to dry for an adequate time to completely remove the solvent therefrom prior to application of the next coat. A minimum of 30 minutes' room temperature drying between coats is preferred and the final nylon coating preferably is dried for a similar period of time.

As the nylon coat dries it shrinks the ball sufficiently to eliminate the use of refrigeration prior to placing the ball in the finishing mold. In addition, as previously indicated, the necessity of dusting is obviated. If the nylon coating were omitted, it would be necessary to use a considerably heavier vinyl resin coating; also refrigeration and dusting would be necessary to reduce the size of the ball preparatory to finish molding. For example, in the case of a practice baseball 2.9" in diameter, and having a core weighing 268 grains, an all-vinyl resin shell weighing 90 grains and formed by 3 coats of vinyl resin "paint" gives a fairly satisfactory ball although dusting and refrigeration are necessary before finish molding. In contrast, the application of 2 dip coats of vinyl resin "paint" to give a dry weight of vinyl resin compound equal to 60 grains followed by one dip coat of nylon solution to give 5.5 grains of dry nylon makes the use of dusting and refrigeration prior to finish molding unnecessary and gives a considerably better appearance in the final ball.

We prefer to apply the several coats making up the shell by dipping.

We prefer that the amount of the pigmented vinyl resin-plasticizer mixture constituting the inner layer of the shell amount to from about 1.0 to about 5.0 grains per square inch of surface area of the ball. If the vinyl resin layer is too thin the color of the ball will be poor because the core will not be completely hidden. In addition, if the vinyl layer is too thin there will be an objectionable tendency for the final ball to exhibit a "moth-eaten" appearance, particularly around the edges of surface indentations, such as dimples, formed in the final molding. In addition, definition of dimples or the like may be deficient.

The amount of nylon constituting the outer layer of the shell preferably amounts to from about 0.03 to approximately 0.4 grain per square inch of surface area of ball. If too little nylon is used in forming the outer jacket, the ball does not shrink enough to be molded without refrigeration. In addition, there is a tendency for the balls with too little nylon to show the objectionable "moth-eaten" appearance. On the other hand, if too much nylon is used, trouble in final molding is often encountered; thus, in the case of a dimpled practice golf ball, the dimple edges tend to become rounded because the ball shrinks so much during the drying of the nylon coating that insufficient pressure upon the shell is produced in the dimpling operation. Also a nylon film which is too heavy gives the finished ball a "boardy" feel and sometimes causes difficulty with cracking when the ball is hit. The indicated range gives best results.

We prefer to use such an amount of nylon as to effect a shrinkage of the pigmented vinyl resin-jacketed ball amounting to from about 0.5 to 3.0% in diameter. The preferred level of nylon application indicated above will effect shrinkage of this order.

The concentration of the nylon solution can vary widely, say from 1% to 20%, but preferably is such that a single dip coat thereof will deposit a nylon layer of suitable thickness to effect the desired shrinkage and give a shell having the requisite characteristics. We have obtained excellent results with a 7–10% solution. Any suitable volatile organic solvent in which the nylon is soluble can be used. The solvent should be volatilizable by drying at room or only moderately elevated temperature.

In practicing our invention, we particularly prefer to employ a soluble grade of nylon and to use it in solution in a volatile solvent composed of a major proportion of a lower ($C_1$ to $C_3$) alkanol (methanol, ethanol, n-propanol or isopropanol), a smaller proportion of a ketone, especially methyl ethyl ketone, and a minor proportion of water, such as a solvent containing from 60 to 90% of the alkanol and ketone and correspondingly from 40 to 10% of water, these proportions being by weight based on the sum of alkanol and ketone and water. We have obtained very good results with a blend of a major proportion of ethyl alcohol and methyl ethyl ketone, using the former in considerable excess over the latter, and a minor proportion of water. In some instances we have used a mixture of alkanol and water only as the solvent. Examples of soluble nylons which can be used are those known as "Type 8, DV–45"; "Type 8, DV–55" and "Type 6, FM–6501," all available commercially from E. I. du Pont de Nemours & Co. These nylons can be used singly or as blends depending on the type of finish desired. Use of a mixture tends to give a duller finish than is obtained with any one of the nylons alone.

Figure 2:
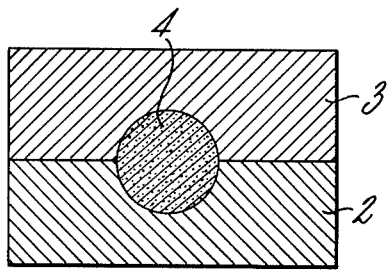
Fig. 2 shows the end of the miniature molding operation.
Figure 3:
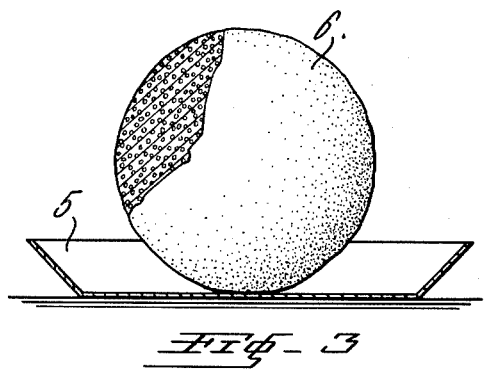
Fig. 3 shows the end of the expanding step applied to the miniature core.
Figure 4:
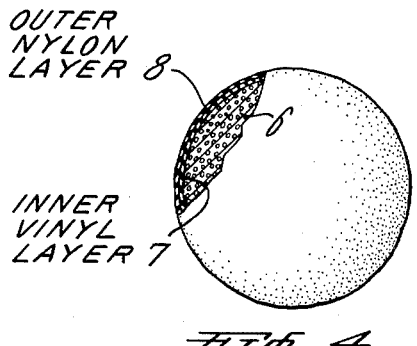
Fig. 4 shows the expanded core with the layers which constitute the shell applied thereto.
Figure 5:
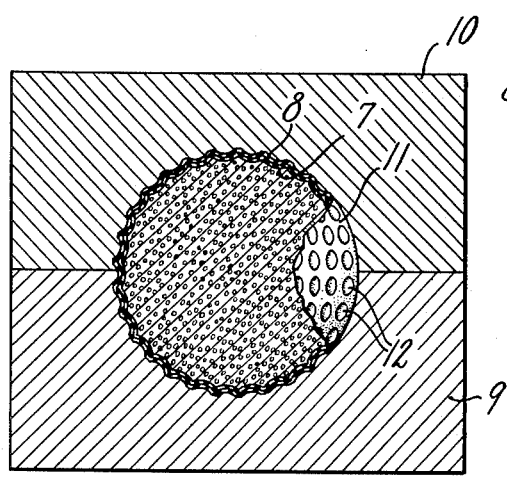
Fig. 5 shows the end of the dimpling operation used in making a practice golf ball, the finished ball being nearly entirely in section.

In the drawings, a pre-form 1 of vinyl resin, rubbery plasticizer therefor, liquid plasticizer, blowing agent, vulcanizing agent, etc., is placed between miniature mold halves 2 and 3 which together form a smooth mold cavity ¾" in diameter, and the mold halves are closed together. Pre-form 1 is then molded under heat and pressure in the miniature mold, yielding a miniature spherical core 4 (Fig. 2) which contains minute bubbles of gas under pressure and/or gas in solution. After thoroughly cooling the mold, the mold halves 2 and 3 are separated and core 4 is removed, expanding slightly as it is released from the mold cavity, expansion being greater from a mold which is less cooled. The core 4 is then heated on open tray 5 in circulating air to a suitably elevated temperature (preferably 325–375° F.) and expanded to form the core 6 which has a roughly spherical shape and at this point is much larger than the core of the finished ball. During the heating to effect the expansion the core should be rotated occasionally to prevent one side from being flat. Such rotation can be effected in any convenient manner. After the expansion step the core 6 is cooled to approximately room temperature, this step causing shrinkage and causing the surface of the core to become quite wrinkled. This shrunken core is then given the necessary number of coats of "paint" preferably based upon a pigmented plasticized vinyl resin as disclosed herein, this forming a thin layer 7 conforming closely to the outer configuration of the core 6, as shown in Fig. 4. The coated core is then given a coat of nylon, in the manner described above, this forming outer layer 8 of the shell. Drying of the nylon core shrinks the ball so that it will fit into a 1.72" dimpled mold cavity formed by dimpling mold halves 9 and 10 of Fig. 5 without extending over the lands of the mold which would cause the core to be cut by the closing mold halves 9 and 10 and result in a defective ball. The mold halves 9 and 10 are then closed under pressure and the mold is heated to effect the dimpling after which it is cooled to approximately room temperature. This operation yields the finished practice golf ball 11 having the dimples 12 over its entire outer surface, these dimples being formed by deformation of the shell and core so as to simulate closely an ordinary golf ball. If desired, a name brand can be engraved on the interior of the dimpling mold so as to be formed in the shell during dimpling.

Figure 6:
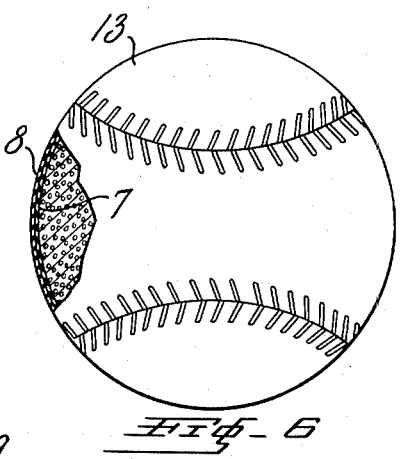
Fig. 6 shows, partly in section and on a reduced scale, a practice or play baseball made in accordance with our invention.

The same general procedure yields a practice baseball as portrayed in Fig. 6.

The following examples illustrate our invention more fully.

EXAMPLE 1

*Core compound*

| Ingredients: | Parts by weight |
|---|---|
| Vinyl resin ("Vinylite VYNW" [1]) | 100 |
| Butadiene-acrylonitrile rubbery copolymer containing about 25% combined acrylonitrile | 100 |
| Ester-type liquid plasticizer | 65 |
| "Unicel" ND (40% dinitrosopentamethylenetetramine) blowing agent | 40 |
| Zinc oxide | 5 |
| Stearic acid | 1 |
| Sulfur | 1 |
| Rubber antioxidant | 1 |
| Stabilizers for vinyl resin | 10 |
| Titanium oxide pigment | 10 |

[1] A copolymer of 93–95% vinyl chloride and 7–5% vinyl acetate.

All of the foregoing ingredients except the rubbery copolymer and rubber antioxidant were mixed together in a powder mixing blender. The rubbery copolymer and rubber antioxidant were milled on a conventional two roll rubber mill until banded. The blend of powders and liquid prepared in the powder mixing blender was then added to the banded rubber, mixing being continued until a continuous sheet of well-mixed compound was obtained. Mixing temperatures were maintained throughout as near to room temperature as possible to prevent premature decomposition of the blowing agent. The resulting sheet was then extruded while cold into a rod of stock, this operation serving to compact or densify the compound by removing entrapped air so that shaped pre-forms of stock having precise volume and weight could be prepared by a conventional procedure. These pre-forms were then made by a "dinking-out" step in which a length of extruded stock representing an excess was placed between two hemispherical mold cavities so that the cavity was entirely filled with compound and the excess stock was squeezed beyond the mold cavity lands by the closing pressure of the mold halves. These pre-forms had a volume equal to approximately 88% of the miniature mold cavity volume. These pre-forms were then molded in miniature in a ¾" diameter smooth surfaced miniature mold under a closing pressure of 4,000 lbs. per cavity and at a temperature of 335° F. for 20 minutes whereupon the molds were cooled while under pressure to bring the miniature molded balls to below 120° F. The molds were then opened and the smooth-surfaced partially cured miniature balls were then removed. There was some slight expansion of the balls as they were released from the mold cavity. The partly cured balls were then heated, with periodic rotation, on an open tray in circulating air at 365° F. for about 60 minutes. During this expansion and heat treatment certain volatiles were removed from the balls inasmuch as they lost about 15% of their original weight during this treatment. Vulcanization of the rubber component was now complete. The expanded balls were not perfect spheres but were slightly irregular. This irregularity was completely removed in the subsequent dimpling operation applied to the shell.

The expanded balls were then cooled to room temperature and dipped into a solvent solution of paint having the following formulation:

*Vinyl resin paint*

| Ingredients: | Parts by weight |
|---|---|
| Vinyl resin ("Vinylite VYNS" [1]) | 100 |
| Ester-type liquid plasticizer | 53 |
| Stabilizers for vinyl resin | 6 |
| Titanium oxide | 20 |
| Methyl ethyl ketone (solvent) | 537 |

[1] A copolymer of 88.5–90.5% vinyl chloride and 11.5–9.5% vinyl acetate.

Two coats of the foregoing paint were applied with drying between coats. This built up a layer of vinyl coating weighing a minimum of 15 grains. The vinyl-coated balls were then dipped in a solution having the following formulation:

*Nylon dip solution*

| Ingredients: | Parts by weight |
|---|---|
| Nylon type 8, DV-45 | 9.0 |
| Ethyl alcohol (commercial grade) | 63.3 |
| Water | 9.0 |
| Methyl ethyl ketone | 18.0 |
| Glycerin | 0.7 |

If the nylon type 8, DV-45 is replaced in part with type 6, FM-6501, a dull finish on the practice ball is obtained.

Following the dipping in the above dip solution and drying, the balls had the following composition:

| Component: | By weight, grains |
|---|---|
| Closed-cell core | 52 |
| Vinyl paint layer | 15 to 27 |
| Nylon outer layer | 0.25 to 4.0 |

The actual value obtained on each component depends on dipping temperature, age of solutions, and other operational variables.

After coating with the above dip solution, the balls were dried to remove the solvent. After drying, the balls had shrunken to a diameter of about 0.5% less than the diameter of the vinyl-coated balls. The resulting balls were then dimpled in a 1.72" diameter dimpling mold.

EXAMPLE 2

Example 1 was duplicated essentially except that a practice baseball was made. The pre-form was larger, having a weight of 290 grains. The miniature mold cavity was formed by two smooth surface hemispherical mold halves having a diameter of 1.27". The miniature mold was closed under a pressure of 9750 lbs. per cavity minimum clamping force and the miniature was cured for 35 minutes at 335° F. in this mold. The miniature cured cores were expanded for 60 minutes at 365° F. by heating on an open tray with periodic stirring as before. A loss of about 15% by weight occurred during the expansion. The expanded balls were cooled to room temperature and then dipped twice in the same vinyl paint formulation as was used in Example 1, with a minimum of 30 minutes' room temperature drying after each dipping. The balls were then dipped in the same nylon solution as was used in Example 1. After the minimum of 30 minutes' drying at room temperature the nylon had contracted the balls approximately 0.5% in diameter so that they were ready for the finish molding operation. The balls were then molded in an engraved finishing mold having a diameter of 2.93", whereby the surface of a regulation baseball was simulated. This molding step continued for 15 minutes at 300° F. and was followed by cooling, while maintaining mold closing pressure for 15 minutes, to room temperature. The final ball had a diameter of 2.9±.1" and had the following composition:

| Component: | By weight, grains |
|---|---|
| Closed-cell core | 268 |
| Vinyl paint layer | 60 |
| Nylon outer layer | 5.5 |

As the vinyl resin used in our core and shell we generally use either polyvinyl chloride or a copolymer of a major proportion of vinyl chloride and a minor proportion of a copolymerizable monomer, e. g., vinyl acetate, methyl acrylate, diethyl maleate, vinylidene chloride, etc., especially a copolymer of 85 to 99% of vinyl chloride and 15 to 1% of vinyl acetate. These vinyl resins are thermoplastic and are fully compatible with the butadiene-acrylonitrile rubbery copolymer typically used in making the core.

As the plasticizer for the vinyl resin used in the core and shell we generally use a high-boiling organic liquid plasticizer but we do not desire to be restricted to use of such a plasticizer since we could conceivably use a plasticizer which was semi-solid or even solid at ordinary temperatures, e. g., a polymeric plasticizer.

The relative proportions of core and shell of balls made by our invention typically are:

Core—
From about 60 to about 80% by weight
From about 96.0 to about 99.5% by volume
Shell—
From about 40 to about 20% by weight
From about 4.0 to about 0.5% by volume In the shell, the weight of the inner vinyl paint layer is usually from about 5 to about 80 times that of the outer nylon layer.

After discovery of the unusual behavior of nylon in effecting shrinkage preparatory to the finished molding apparatus and in giving other outstanding advantages described above, it was reasoned that materials other than nylon should give the same results. Accordingly, tests were made with 5 and 10% solutions of cellulose acetate, cellulose nitrate, ethyl cellulose, and methyl cellulose. Although all of these materials exhibited the ability of shrinking the ball so that it would be small enough for the final molding operation without refrigeration, and gave some improvement in ball smoothness and tended to improve the moth-eaten appearance of an all-vinyl shell, none of them gave a film with sufficient stretch to stand up under sharp blows such as those caused by hitting with a golf club. In addition, all of these materials showed poor adhesion to the inner vinyl layer. Accordingly it was concluded that none of these materials would give the unusual results obtained with nylon in accordance with the invention.

Having thus described our invention, what we claim and desire to protect by Letters Patent is:

1. The method of making a practice or play ball which comprises molding a miniature spherical core containing gas under pressure, from a mixture of a thermoplastic vinyl resin, a rubbery copolymer of an aliphatic conjugated diolefin hydrocarbon and another copolymerizable monomer, which copolymer is compatible with said vinyl resin, a plasticizer for said resin, a chemical blowing agent, and a vulcanizing agent for said rubbery material, under such conditions as to decompose said blowing agent, partially vulcanize said rubbery material so that it will retain the gas evolved by the blowing agent, and yield a miniature core in which said resin, rubbery material and plasticizer constitute a single homogeneous phase, expanding said miniature core to closed-cell form and completing vulcanization of said rubbery material by applying heat under such conditions that said core is free to expand and thereby converting the miniature core to a flexible compressible closed-cell expanded core, cooling the expanded core to approximately room temperature to shrink it and impart a wrinkled surface thereto, providing the resulting core with a coating of a uniform solid mixture of a thermoplastic vinyl resin and a plasticizer therefor, coating the thus-coated core with a solution of a synthetic linear condensation polyamide in a volatile solvent, evaporating said solvent to deposit a layer of said polyamide around the plasticized vinyl resin layer and contract the coated core to a size substantially smaller than the final ball, and shaping the coating of the resulting contracted coated core by molding under heat and pressure to form the finished ball, the aforementioned vinyl resins being selected from the group consisting of polyvinyl chloride and resinous copolymers of a major proportion of vinyl chloride and a minor proportion of a copolymerizable monomer, the thicknesses of said plasticized vinyl resin layer and said polyamide layer being such that the shell of the finished ball is flexible and tenaciously adherent to the core thereof and permits deformation of the core without separation or cracking of the shell.

2. The method of claim 1 wherein said core is provided with said coating by applying a pigmented solution of a vinyl resin and a plasticizer therefor in a volatile solvent to the expanded core and subsequently evaporating said solvent to deposit the said uniform solid mixture.

3. The method of claim 1 wherein an alcoholic solution of said polyamide is employed.

4. The method of claim 1 wherein the amount of said solid mixture is equal to from approximately 1.0 to approximately 5.0 grains per square inch of surface area of the ball and wherein the amount of said polyamide is equal to from approximately 0.03 to approximately 0.4 grain per square inch of surface area of the ball.

References Cited in the file of this patent

UNITED STATES PATENTS

| Re. 21,063 | Voit | Apr. 25, 1939 |
| 1,653,893 | Eden | Dec. 27, 1927 |
| 2,320,088 | Leekley | May 25, 1943 |
| 2,484,397 | Barton | Oct. 11, 1949 |
| 2,525,965 | Smith | Oct. 17, 1950 |
| 2,599,390 | Huse | June 3, 1952 |

FOREIGN PATENTS

| 646,879 | Great Britain | Nov. 29, 1950 |